US011080305B2

(12) United States Patent
Kilje et al.

(10) Patent No.: US 11,080,305 B2
(45) Date of Patent: Aug. 3, 2021

(54) RELATIONAL LOG ENTRY INSTITUTING SYSTEM

(71) Applicant: Accenture Global Solutions Limited, Dublin (IE)

(72) Inventors: Rahul Kilje, Maharashtra (IN); Prasad Damodar Kini, Maharashtra (IN); Shradha Shridhar Puro, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 615 days.

(21) Appl. No.: 15/847,620

(22) Filed: Dec. 19, 2017

(65) Prior Publication Data
US 2019/0005111 A1    Jan. 3, 2019

(30) Foreign Application Priority Data
Jun. 29, 2017    (IN) .............................. 201741022738

(51) Int. Cl.
G06F 16/28        (2019.01)
G06F 16/81        (2019.01)
(52) U.S. Cl.
CPC ............ *G06F 16/285* (2019.01); *G06F 16/81* (2019.01)
(58) Field of Classification Search
None
See application file for complete search history.

(56) References Cited

U.S. PATENT DOCUMENTS

| 2005/0193004 | A1 | 9/2005 | Cafeo et al. |
| 2006/0168569 | A1* | 7/2006 | Smith ................ G06F 11/3672 717/124 |
| 2011/0040811 | A1 | 2/2011 | Leigh |

OTHER PUBLICATIONS

Jonadab, Black Perl updated for Perl 5 Feb. 21, 2003, perlmonks.org, https://perlmonks.org/index.pl?node_id=237465.*
Eyepopslikeamosquito, The Top Ten Perl Poems Dec. 25, 2014, perlmonks.org, https://www.perlmonks.org/?node_id=1111395.*
Codd's 12 rules Feb. 26, 2020, w3resource.com, https://www.w3resource.com/sql/sql-basic/codd-12-rule-relation.php.*
Fowler, The King's Enbglish 1908, Clarendon Press, 2nd ed., https://www.w3resource.com/sql/sql-basic/codd-12-rule-relation.php.*

(Continued)

*Primary Examiner* — Jason G Liao
(74) *Attorney, Agent, or Firm* — Brinks Gilson & Lione

(57) ABSTRACT

A system may parse a group of manuscripts to extract manuscript properties and textual data included in each respective manuscript. The system may perform computer based identification of a predetermined category in which each respective manuscript resides and generate a categorized inventory of log entries, which include the manuscript properties and the textual data as respective field values. Each of the log entries may be representative of one of the manuscripts and may be categorized in the categorized inventory of log entries according to the predetermined category. The system may generate derived field values in at least some of the log entries. The derived field values may be indicative of at least some of the respective field values. The system may generate an architectural computer based dimensional mapping of a categorized inventory of log entries based on the relational association among the respective field values and the derived field values.

19 Claims, 9 Drawing Sheets

(56) References Cited

OTHER PUBLICATIONS

Waltmire, Viewing Patent Applicatoin Status and History at USPTO Online, waltmire.com, https://www.waitmire.com/2014/03/13/viewing-patent-application-status-history-uspto-online-pair/.*

Quick Start Guide, date unknown [captured by archive.org on Sep. 5, 2015], USPTO, https://web.archive.org/web/20150905135220/http://www.uspto.gov/sites/default/files/patents/process/status/private_pair/PAIR_Glossary.pdf.*

EFS—Web Online Patent Filing Simmple and Secure, date unknown, USPTO, https://www.uspto.gov/sites/default/files/patents/process/file/efs/guidance/EFSWEB_Brochure.pdf.*

Major, Automated XML conversion helps USPTO reinvent patent processing Jul. 17, 2015, gcn.com, https://gcn.com/articles/2015/07/17/uspto-document-conversion.aspx.*

United States Code, date unknown, US Government Publishing Office, Title 35, Sec. 119.*

Code of Federal Regulation, date unknown, US Government Publishing Office, vol. 37, Sec. 1.52(b)(1)(ii).*

Team CGI, USPTO PE2E Enhancement Evaluation PartName and PartNumber Extraction Oct. 7, 2014, USPTO, ver 1.0 13 pages.*

Office of the Chief Information Officer, USPTO Systems Development Life Cycle IFW Solution Design Document (SDD) Jun. 2011, USPTO, ver 1.1, 26 pages.*

Office of the Chief Information Officer, USPTO Systems Development Life Cycle eDAN Solution Design Document (SDD) Sep. 12, USPTO, Ver 1.1, 29 pages.*

LIST Innovative Solutions, Solution Architecture Document (SAD) For PE2E—PATI Continuous Capture of Application Data (PATI-CDC) Jun. 13, 2013, USPTO, Ver 1.1, 24 pages.*

Sumset, What is Product Definition: And How to Define Products To Get Everyone Willing to Build It Jul. 18, 2017, UX Collective, https://uxdesign.cc/what-is-product-definition-and-how-to-define-products-to-get-everyone-willing-to-build-it-df56c95f9773.*

Lake, Consumer Behavior for Dummies 09, Wiley Publishing, pp. 47-48.*

Model Based Definition in Product Manufacturing May 20, 2017, Digital Machining Systems, http://www.digitalmachining.com/news/Model-Based-Definition-in-Product-Manufacturing.*

Virtual Column [captured by USPTO on Jul. 1, 2020], Wikimedia Foundation, https://en.wikipedia.org/wiki/Virtual_column.*

First Examination Report issued on Indian application 201844024094, dated Jan. 12, 2021, 7 pages.

* cited by examiner

| Inventory | Metadata | | | | | | | |
|---|---|---|---|---|---|---|---|---|
| Form Details | Form Mapped Field Details | Data Jobs | Form Controls | | | | | |
| MappedFieldName | MappedFieldNameOnForm | FormatValue | FormatSpecifier | ReadOnly | Required | FormName | Group | Iter |
| PolicyOutput.PolicyNu... | Policy Number | | | | | CU04020514 | Policy | |
| CovConfidentialInfoLiab... | Electronic Data Liability Premium | | | | | CU04020514 | Policy | |
| CovConfidentialInfoLo... | Loss of Electronic Data Limit | format | | | | CU04020514 | Policy | |
| | PolicyNumber | | | | | UC45010713 | data | |
| | PolicyNumber | | | | | UC45020713 | data | |
| | PolicyNumber | | | | | UC45030713 | data | |
| | PolicyNumber | | | | | UC45090713 | data | |
| | PolicyNumber | | | | | UC45270713 | data | |
| | PolicyNumber | | | | | UC45300713 | data | |
| PolicyOutput.PolicyNu... | PolNum | | | | | EC04010713 | data | |
| CovAdditionalInsured_I... | AddIns | | | | | EC04010713 | data | |
| CovAdditionalInsured_I... | AnyAddIns | | | | False | CX11180413 | CovExclu... | |
| PolicyOutput.PolicyNu... | PolicyNumber | | | | | CX11180413 | CovExclu... | |
| CovExclusionAbuseOrM... | DescOfPS | | | | | EC04170713 | data | |
| PolicyOutput.PolicyNu... | PolNum | | | | | EC04170713 | data | |
| CovLimitationOfCovera... | DesgOrg | | | | | UC45400713 | data | |
| | PolicyNumber | | | | | UC45410713 | data | |
| | PolicyNumber | | | | | | | |

FIG. 7

RELATIONAL LOG ENTRY INSTITUTING SYSTEM

CROSS REFERENCE TO RELATED APPLICATIONS

The present application is entitled to a right of priority pursuant to 35 U.S.C. § 119 from India Patent Application No. 201741022738 filed Jun. 29, 2017, which is herein entirely incorporated by reference.

TECHNICAL FIELD

This disclosure relates to log entry generation and management and more particularly to a system for relational log entry instituting.

BACKGROUND

Computer systems today possess unprecedented levels of processing power, memory, volume storage, and other resources, not only in locally implemented hardware, but also in remotely implemented systems, e.g., in cloud hosted systems. Businesses now have large and/or complex applications operating various aspects of their business. Such large and/or complex applications may operate with complex information formats. There is a need for a system that can extract information from such systems and provide the capability to view, understand, and relationally analyze/organize such extracted information, as well as perform quality control functions and report such extracted information.

BRIEF DESCRIPTION OF THE DRAWINGS

FIG. 3 is an example graphical user interface (GUI) display illustrating an inventory tab.

FIG. 4 is an example of a GUI display illustrating a metadata tab.

FIG. 7 is an example of a GUI display illustrating a forms tab.

DETAILED DESCRIPTION

The discussion below makes reference to a relational log entry instituting system (RLEIS) that includes an automated development and processing platform (ADAP). The RLEIS is a tool that provides automated computer based discovery, generation, mapping, display, manipulation and updates for complex computer based applications that abstracts process flows, implementation details and code complexity of the computer based application. The system provides automated acceleration of analysis, development, and delivery of log entries to institute the log entries in an organized relational hierarchy that allows effective and efficient visualization, computer operational processing, analysis, organization and modification of complex applications from which the log entries are derived and generated. The RLEIS system provides a user interface, organization hierarchy and output that performs log entry discovery, log entry categorization, log entry generation, and quality analysis of existing components used in a complex computing system.

In addition, the system provides selective modification of existing log entries, addition of new log entries, import of components from the complex system, and export of the modified components to the complex system. In an example, a complex application may include a number of computer-implemented manuscripts which are product definitions for the complex application. The RLEIS may parse components of the manuscripts and generate log entries. The RLEIS may provide architectural computer based dimensional mapping of a categorized inventory of the log entries. In addition to dimensional mapping, the system may adaptively create relational associations among respective field values of different respective log entries within the categorized inventory of log entries. The relational associations may be created based on the respective field values and derived field values generated and added to the log entries by the system.

Figure 1:
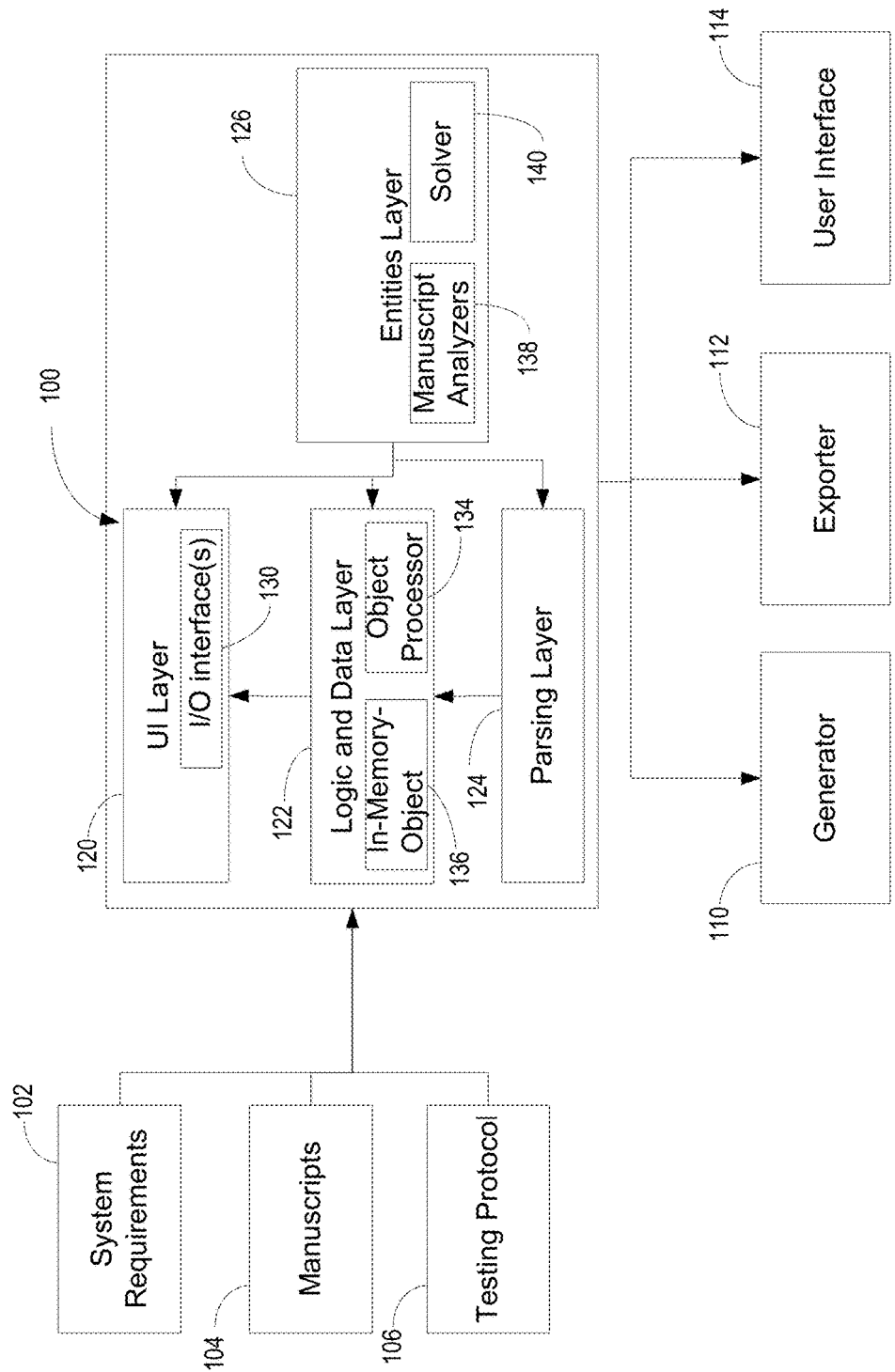
FIG. 1 is a block diagram of an example relational log entry instituting system.

FIG. 1 is a block diagram illustrating an example of the RLEIS 100. The RLEIS is supplied information in the form of system requirements 102, computer-implemented manuscript 104 and a testing protocol 106. Outputs from the RLEIS 100 include generation of reports, code, and other information from generator 110, export files from exporter 112, and user interface 114. The generation of code may include, for example, form XML, such as snippets for specific computer-implemented manuscripts, page XML, and/or upgrade and test scripts. Export files may include an as-is-report, a quality review report, rule complexity report, and field metadata report.

The RLEIS 100 may be developed and deployed using a computer based system that includes applications such as Windows Presentation Foundation Model Model-view-view Model (WPF MVVM) along with an N-Layer Architecture. In an example, the RLEIS 100 may include multiple layers such as user interface (UI) layer circuitry 120, logic and data layer circuitry 122, parsing layer circuitry 124 and entities layer circuitry 126. In other examples, fewer or additional layers may be included to describe the functionality of the system 100 discussed herein.

The system 100 provides functionality to analyze, modify, study, install, and maintain manuscripts 104 in a complex application. Complex applications may be any large scale computing system, such as application management systems, distributed process control systems, product manufacturing systems, and the like. Manuscripts may be product definitions used by the complex application to operate. Each of the manuscripts may be a predetermined schema that includes fields containing data, such as textual information, and executable logic. There may be a number of different predetermined schema, which may form groups of manuscripts. In an example, each of the manuscripts may be XML files. The system 100 may operate as a platform to accelerate integration and application outsourcing deliveries to a complex application project by providing extensive automation and tooling capabilities related to the manuscripts, thus enabling efficiencies and cost savings in computer processing requirements, data analysis, quality control, information display and modification/updates to the complex application. The system 100 may, for example, provide a single place and platform for automated extraction, parsing, analysis, modification, characterization, and association of components of a complex application from a pre-analyze mode to run phases mode(s). The system 100 may, for example, provide an approach to automation delivery based on single meta-data stored in memory with a layered approach to be agnostic to the source of meta-data. In some examples, discrete functions within the system 100 may be API enabled. For example, the RLEIS 100 may include an application and an API layer to interface with the manuscripts 104.

The system requirements 102 used by the RLEIS 100 may be any form of complex application specific descriptions, rules and other information used by the system to generate and manage the log entries. For example, the system requirements 102 may provide predetermined categories in which the manuscripts may reside. In addition, the system requirements 102 may include configuration parameters and properties related to the manuscripts and/or the log entries for a complex application. The system may generate the system requirements, as modifications, changes and additions to the manuscripts occur. The generated output like Page metadata and form metadata will be useful to generate a system requirements document, such as a PL101 requirements document.

The testing protocol 106 may provide parameters for generation of automated testing capability in the system 100. Automated testing may include scripts, regression, script building, and the like. Such testing may be used to confirm proper generation of the log entries, generation of derived fields and/or derived field values, accuracy of categorizations, or any other functionality or activity of the system 100.

The UI layer circuitry 120 may include functionality to provide input/output (I/O) interfaces 130. The input/output interfaces 130 may include a graphical user interface that receives input parameters into the system from a user, and other user interface elements. The I/O interfaces 130 may further include web or digital interfaces to communicate with manuscripts through an API or any other communication channel.

The logic and data layer circuitry 122 may include any combination of hardware, software, firmware, or other circuitry. The logic and data layer circuitry 122 is part of the implementation of any desired functionality in the system 100. In that regard, the logic and data layer circuitry 122 may include logic that facilitates, as examples, running applications; accepting user inputs; saving and retrieving application data; establishing, maintaining, and handling terminated data connections for, as one example, Internet connectivity; establishing, maintaining, and terminating wireless network connections, or other connections; and displaying relevant information on the user interface layer circuitry 120.

The logic and data layer circuitry 122 may be implemented in hardware, and may include software. In an implementation, the logic and data layer circuitry 122 includes one or more object processors 134, or one or more processors, and in-memory-object 136, or memory. The in-memory-object 136 may store instructions (e.g., program instructions) for execution by the object processor 134. The in-memory-object 136 may also hold packets or other data received at a communication interface. The in-memory-object 136 may store, for example, manuscript metadata, control parameters, control instructions, and other system logic that the object processor 134 may utilize to execute desired functionality for the system 100. The control parameters may provide and specify configuration and operating options for the control instructions. For instance, the control instructions and control parameters may implement the parsing layer 124 and the entities layer circuitry 126. The in-in-memory-object 136 may also store any data that is generated, sent or received by the system 100. In an example, the logic and data layer circuitry 122 may include logic implemented within RLEIS 100 for Rules Complexity Logic, Customized Fields, Integration Fields, Review and Validation rules, Code Generation, Testing Automation Report Data, Rating Calculation Algorithm Details and Process Automation.

The parsing layer circuitry 124 may include a number of different parsers that are useable by the system 100 to discover the properties of the manuscripts 104. The parsers may be divided into manuscript parsers capable of extracting information from any manuscript, and categorical parsers capable of extracting information from only manuscripts in a predetermined category or schema. In an example, manuscripts from a complex application may be in a predetermined format, such as XML for available product entities. Hence the RLEIS tool 100 may also revolved around XML files or manuscripts discovered and extracted from the complex application. For the entity layers circuitry 126, the manuscripts, such as XML, may be parsed and represented using technologies such as XML Serialization, LINQ to XML, .Net entities, and the like. For example, manuscripts may be identified as including public fields and private fields, where a public field may be extracted to be an object, such as a CLR object of a class, such as Class FieldDetails with properties such as Caption, Type, IsReadonly, and the like being represented in a log entry.

The entities layer circuitry 126 may include analyzers 138 and solvers 140. The analyzers 138 may be circuitry or an engine with functionality to discover an architectural hierarchy and extract information to populate the discovered hierarchy from the manuscripts using the parsing layer 124 to develop dimensional mapping of categorized inventory of log entries. In addition, the analyzers 130 may perform mapping into architecture hierarchy aspects of a complex application. In an example, aspects of the complex application may include system landscape, Forms, Pages, Rules/Ratings, Integrations, Business Process and Customizations. This overcomes challenges related to fully developing the hierarchical relational architecture mapping of manuscripts included in a complex application. By developing hierarchical relational architecture mapping of manuscripts, obstacles to efficient operation, analysis, and/or changes to the complex application, such as poor documentation, unavailability of skilled resources, shortening of knowledge acquisition phase and reduction in dependency on customers may be minimized or eliminated.

The analyzers 138 may perform an analysis of manuscripts and parse the manuscripts to generate log entries. Parsing of the manuscripts by the analyzers 138 may be based on, for example, identification of patterns or a schema within the manuscripts. Once the patterns are identified, parsing techniques such as .NET or XML may be applied to parse the manuscripts. During analysis, the analyzers 138 may identify different parameters within the manuscripts. Parameters may include public fields and private fields from the manuscripts, manuscript properties, and other information stored in the manuscripts. For example, the analyzers 138 may identify types or categories of manuscripts, such as based on pattern matching and/or schema attributes, so that the manuscripts may be grouped or associated. Manuscripts may also be hierarchically aligned, and relationships between the customized manuscripts may be derived based on the log entries generated.

In addition, the analyzers 138 may identify parameters such as specific fields and other data within the manuscripts. Further, the analyzers 138 may identify relationships between manuscripts, relationships between the data fields, and/or relationships between the manuscripts and the data fields. The analyzers 138 may generate log entries from components included in the manuscripts. The log entries may selectively contain parameters, or field values, from the manuscripts and may be inherited from manuscripts. The field values may also be inherited from a parent manuscript. In this way the system can derive the inheritance between newly developed and base manuscripts.

The outputs of the analyzers 138 may be provided by the generator 110, the exporter 112 and/or the user interface 114. The generator 110 may generate and output various detailed information from the log entries in requirement format, such as, for example, in a PL101 document. Output generated with the generator 110 may include formatted documents such as forms and pages available from the complex application, ratings details and relationships from the complex application, testing protocols for the complex application, and manuscript upgrades, such as XML snippets. The exporter 112 may extract information from the log entries and generate various reports, such as spreadsheets and the like, as requested by a user. In addition, any analysis performed with the system 100 may be generated by the exporter 112 in the form of a report or other format providing the results of the analysis. The exporter 112 may also generate the system requirements 102 as part of the process of implementing additions and/or changes to the manuscripts.

The user interface 114, may include, for example a display or other hardware operating in connection with a computer. Using the components as mapped by the analyzer 138, the user interface 114 may display, for example, drill downs, views and grid views illustrating relationships between the field values in the log entries. In addition, the user interface 114 may generate custom views and/or reports where parameters may be compiled from a number of different manuscripts based on associations or relationships identify during parsing of the manuscripts. The user interface 114 may display, for example, a graphical user interface. The user interface 114 may accept network management parameters, annotation analysis commands, and display on the GUI any type of system management interface. The system management interface may visualize, as just a few examples, components extracted/derived from the manuscripts, associations and relationships between components, logic, or any other information extracted from the manuscripts. In addition, the user interface 114 may display menus and other drill down functions to characterize the components, logic, etc. The user interface 114 may be responsive to user inputs to adjust or modify the information being displayed. The user inputs include keyboard, mouse, voice recognition, touchscreen, and any other type of input mechanisms for operator interaction with the system that may be included as part of the user interface 114.

Figure 2:
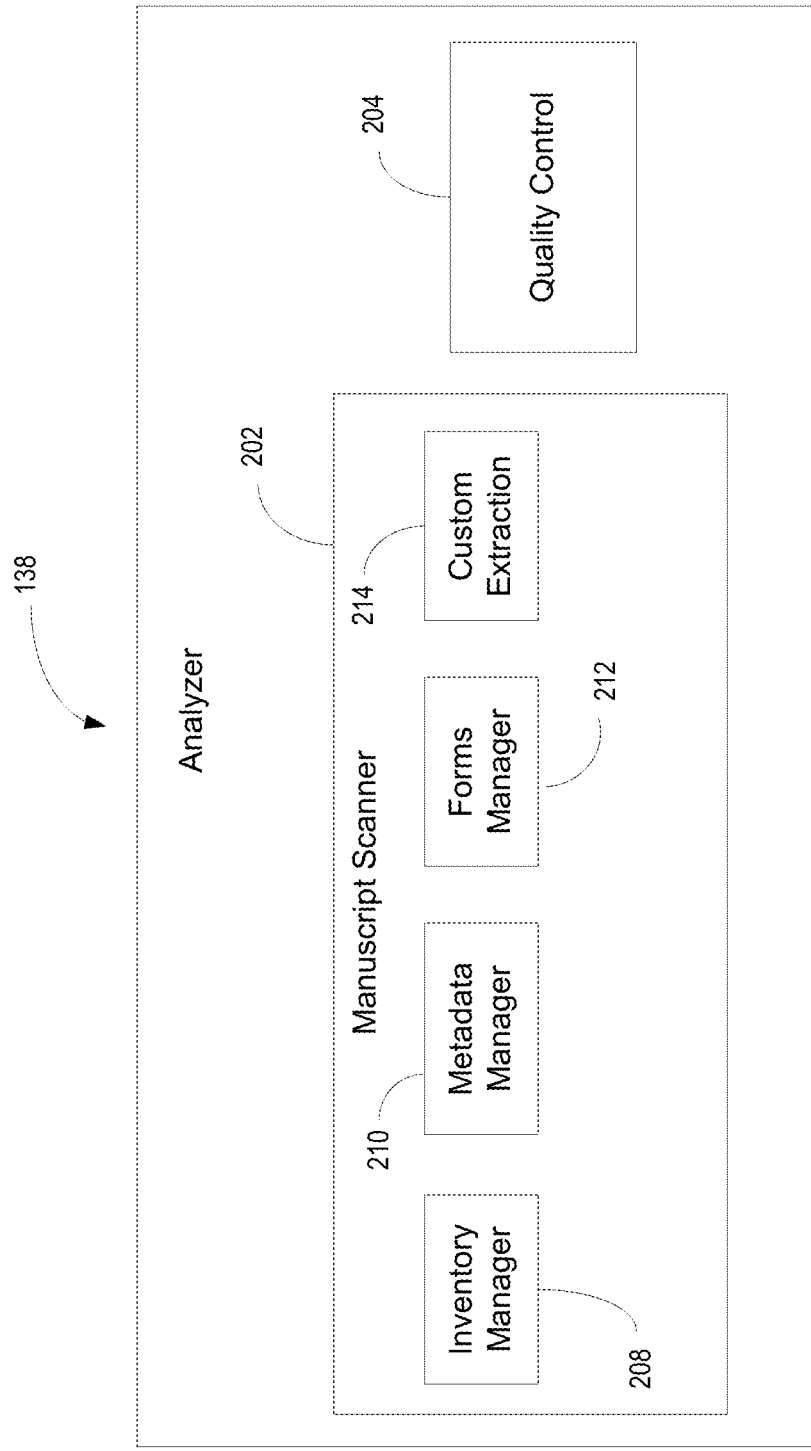
FIG. 2 is a block diagram illustrating an example of an analyzer included in the entities layer circuitry of the system.

FIG. 2 is a block diagram illustrating an example of the analyzer 138 included in the entities layer of the system. The analyzer 138 may include a manuscript scanner 202 and a quality control analyzer 204. The manuscript scanner 202 may analyze the various manuscripts in a complex application project and generate log entries representative of respective manuscripts that are present. The quality control analyzer may perform various verification processes to confirm accuracy and completeness of the generation of, for example, the log entries. The manuscript scanner 202 may include an inventory manager 208 configured to determine the inventory of each of the manuscripts for a particular complex application project.

The inventory manager 208 may search for manuscript related attributes in different sections of each manuscript in the project to determine the category or schema in which the respective manuscript resides. For example, the inventory manager 208 may search for a "productCode" attribute in the properties section of each manuscript. The relevant manuscript data identified by the inventory manager 208 may be stored as part respective log entries for each respective manuscript. The inventory manager 208 may also search for and extract other attributes of each of the manuscripts and include them in the respective log entries. In an example, the identified and extracted attributes included in the log entry of a respective manuscript may include details such as manuscript id, manuscript version id, version data, and the like.

The inventory manager 208 may also manage an inheritance hierarchy within the manuscripts. The inheritance hierarchy identifies components within the manuscripts that are duplicative among different manuscripts. The inventory manager 208 may build a manuscripts inheritance hierarchy structure in memory using attributes of the log entries such as identifiers (ID), address, such as a URL, a product code or any other unique identifier of the log entries. Inheritance relationships are identified by the inventory manager 208 and stored, for example, in a catalog file as catalog file entries with respective attributes of the log entries. In a further example, address data also may be stored as one of the attributes in the catalog file. Thus, if a field value in a first log entry is also present in a second log entry, the inventory manager 208 may populate the catalog file with an inheritance hierarchy showing that the second log entry uses the same value as the first log entry. Due to the indication in the catalog file, the second log entry does not need to duplicatively store/include the field value which is also stored in the first log entry. Instead, such runtime inheritance relationships may be accessed at various points to retrieve the shared field value.

During example operation, the catalogue file may be selected as part of parsing a respective manuscript so that any inheritance relationships may be identified or established as the log entries are generated and/or modified. The inheritance relationships may be displayed when a category of log entries is displayed by also showing log entries from other categories which share a field value of a log entry in the category. For example, a user may select a category and not select the catalogue file so that all the log entries from the category are displayed. In another example, a user may select a category and also select the catalogue file so that only those log entries of the category having an inheritance relationship are displayed, and the log entries from the same category and/or different categories that are members of a respective inheritance relationship are also displayed.

Thus, the inheritance hierarchy improves the functional operation of the underlying computer devices/system(s) by reducing the data storage requirements. In addition, the log entries that use the inheritance hierarchy reduce the amount of data processing and iterative processing that must be performed by the underlying computing system. Changes in the inheritance hierarchy may be a result of changes to other field values or logic in a log entry or corresponding manuscript. The inventory manager 208 may provide changes, additions and modifications that impact the inheritance hierarchy between log entries and make automated changes, such as to the catalogue file, to reflect the adjust inheritance hierarchy relationships. Such automated changes may include establishing a new inheritance hierarchy between log entries, adding a new log entry to an existing hierarchy, deleting an existing log entry, and/or modifying an existing one or more log entries.

script, and the value XML field 410 may be an indication of derivation of the value field from the respective manuscript, which is generated as a derived field. The misc. rule field 412 may provide a translation of a rule condition or expression into an English like sentence, and may also be a derived field. For example XML code of a rule condition of:

```
<condition>
    <comparison compare="or">
        <comparison compare="or">
            <comparison compare="eq">
                <operand idref="TheftOfConstructionMaterialsAndSuppliesInput.Indicator" type="boolean" />
                <operand idref="False" type="int" />
            </comparison>
            <comparison compare="eq">
                <operand idref="RiskOutputNonShredded.HasCoveragesChanged" type="boolean" />
                <operand idref="True" type="int" />
            </comparison>
        </comparison>
        <operand idref="RiskPrivate.ActivePageRules" type="boolean" />
    </comparison>
</condition>
```

Figure 3:
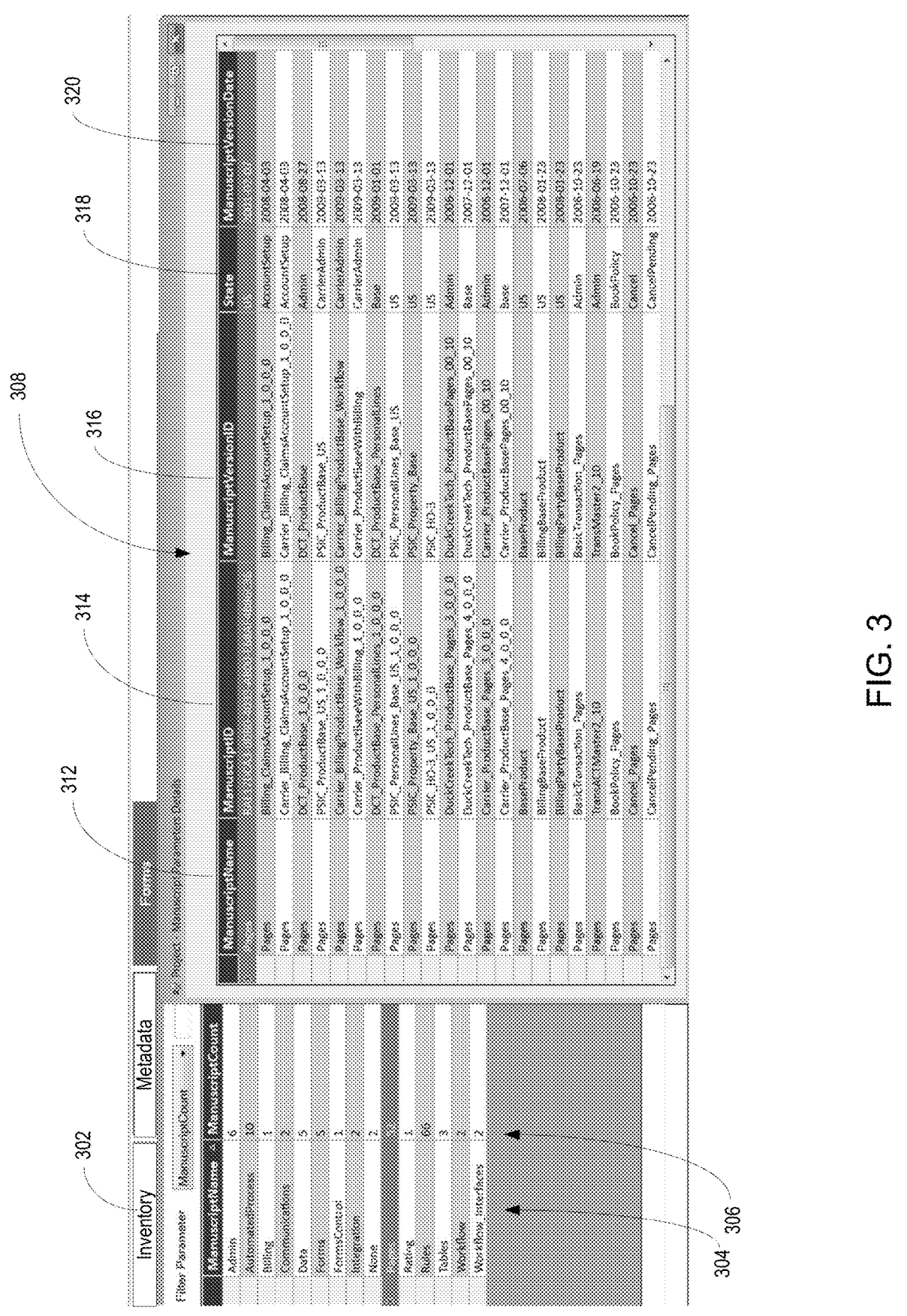

FIG. 3 is an example graphical user interface (GUI) display illustrating an inventory tab 302. The inventory tab 302 may include a list of categories of manuscripts 304 identified as be included in the complex application project. For each category of manuscript in the list 304 a number of manuscripts 306 identified as being included in the respective category by the inventory manager 208 may be indicated. When a category of manuscripts is selected, attributes of each manuscript in the category may be displayed in a manuscript attribute details window 308. Within the manuscript attribute details window 308, attributes of each respective manuscript in the selected category may be displayed. In the example of FIG. 3, the attributes extracted from the respective manuscripts and included in the data entry of each respective manuscript may include a manuscript name 312, a manuscript ID 314, a manuscript version 316, a state 318, and a manuscript version date 320. In other examples, other attributes may be extracted from the respective manuscript, stored in the respective log entry, and/or displayed in the manuscript attribute window 308.

Referring again to FIG. 2, the analyzer 138 may also include a metadata manager 210. The metadata manager 210 may identify and extract metadata from each of the manuscripts. The metadata, such as textual information, may be added as field values in the respective log entries. The metadata extraction may be performed differently by the metadata manager 210 depending on the category in which a respective manuscript resides. In addition, the metadata manager 210 may do the same metadata extraction in all of the manuscripts to retrieve corresponding field values from each of the manuscripts.

Figure 4:
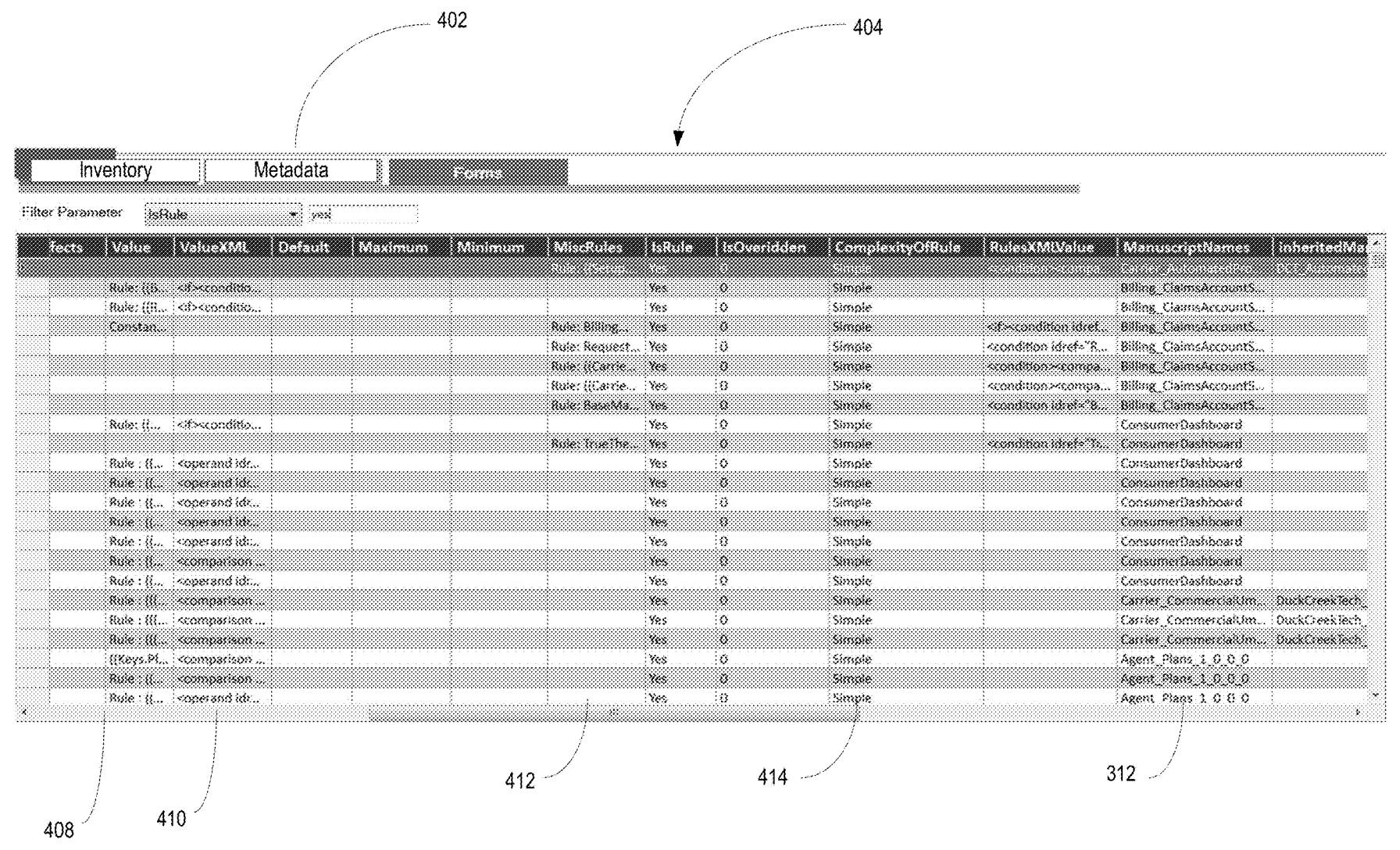

FIG. 4 is an example of a GUI display illustrating a metadata tab 402. On the field metadata tab 402 are field values 404, which are attributes of each of a plurality of log entries positioned in rows, where each row represents a log entry. Among the field values 404 is a value field 408, a value XML field 410, a misc. rule field 412, a complexity of rule field 414 and the manuscript names field 312. In other examples fewer or additional field values may be included in each log entry. The value field 408 may be indicative of parameters or constants derived from a respective manumay be analyzed and translated to: ((TheftOfConstruction MaterialsAndSuppliesInput.Indicator=False) Or (RiskOutputNonShredded.HasCoveragesChanged=True)) Or (RiskPrivate.ActivePageRules)), which may be stored in the misc. rule field 412 as a derived field value in an derived field generated by the system in a respective log entry. In another example, XML code of an expression of:

```
<calculation>
    <argument op="eq" idref="PageRule200035Private.RuleCondition" type="boolean" />
    <argument op="add" idref="PageRule200036Private.RuleCondition" type="boolean" />
    <argument op="add" idref="PageRule200037Private.RuleCondition" type="boolean" />
    <argument op="add" idref="PageRule200038Private.RuleCondition" type="boolean" />
    <argument op="add" idref="PageRule200039Private.RuleCondition" type="boolean" />
    <argument op="add" idref="PageRule110016Private.RuleCondition" type="boolean" />
</calculation>
``` may be analyzed and translated to:

= *PageRule*200035*Private.RuleCondition*+

*PageRule*200036*Private.RuleCondition*+

*PageRule*200037*Private.RuleCondition*+

*PageRule*200038*Private.RuleCondition*+

*PageRule*200039*Private.RuleCondition*+

*PageRule*110016*Private.RuleCondition* which may be stored in the misc. rule field 412 as an derived field value in an derived field generated by the system in a respective log entry. Identification of such rules and expressions in respective manuscripts and conversion of the code to a human readable form allows a user to discern the function of such rules and expressions in a respective manuscript without parsing the native content of the manuscript. Moreover, the log entries provide a computer based architectural dimensional mapping that is otherwise not discernable from the manuscripts. In addition, adaptively created relational associations among the field values of different log entries provides analysis and insight that would not be available in any form from the manuscripts. Also, the derived fields provide the system with additional information that improves the underlying functionality of the computing hardware since the derived fields are used by the system to generate the relational associations which are otherwise not present.

The complexity of rule field 414 may be derived by reviewing all of the manuscripts in a complex application project for use of a rule parameter within different manuscripts. For example, the number of times a rule parameter is used in public fields, private fields and pages of the manuscripts may be determined. Such information may be displayed in the form of a hierarchical structure indicating the public fields, private fields and pages in which the rule parameter is used. A predetermined complexity level of the rule parameter may be assigned, such as simple, slightly complex, low complexity, medium complexity and high complexity. The predetermined complexity level may be assigned based on predetermined thresholds, such as, for example, a number of uses of the rule parameter in private fields, public fields, or pages of the manuscripts. Alternatively, or in addition, the predetermined complexity level may be assigned based on predetermined thresholds, such as, for example, rule complexity derived and configured based on project definition(s). Once generated, the complexity level may be stored in an derived field in a respective log entry as an derived field value.

Figure 5:
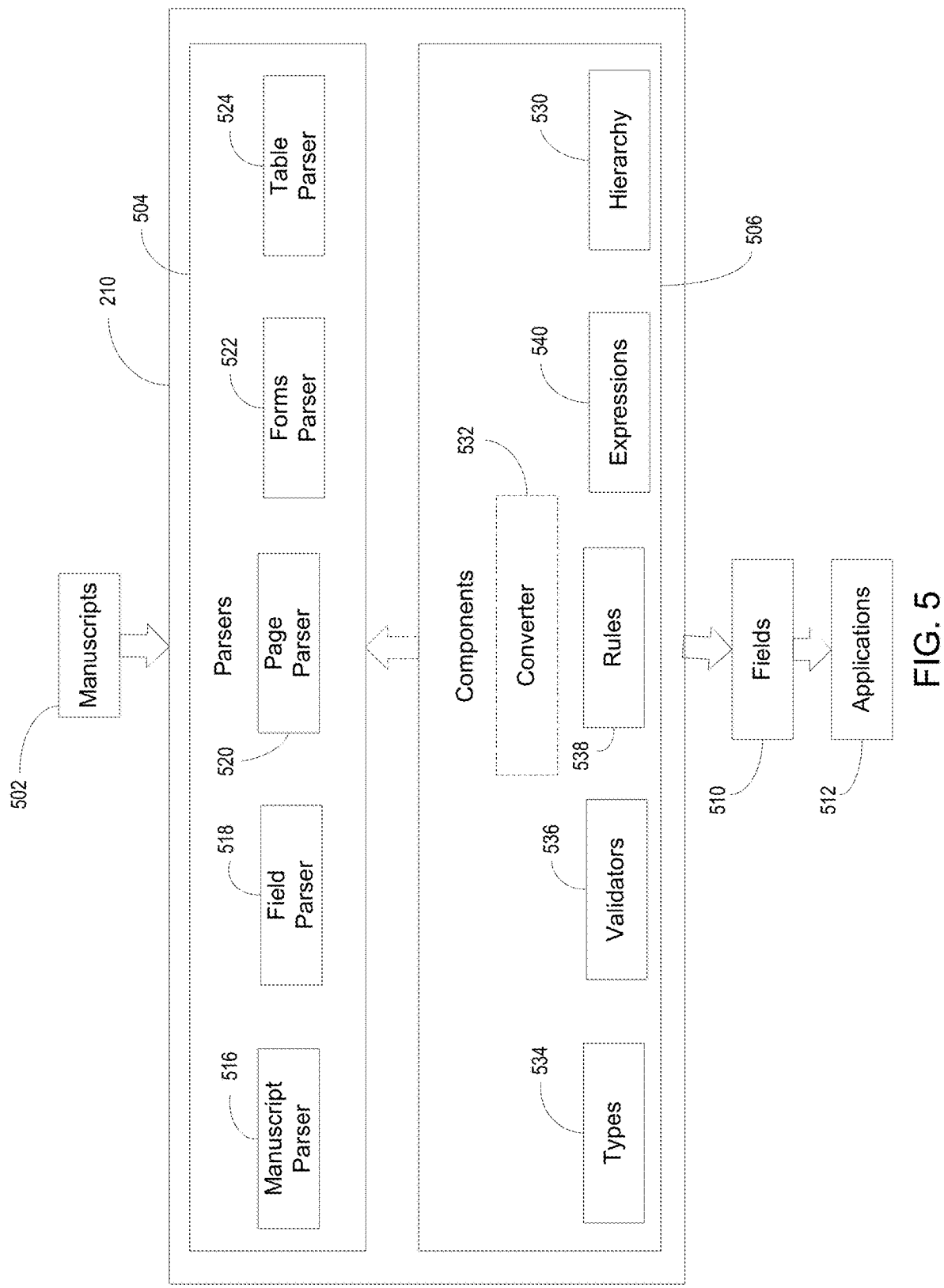
FIG. 5 is a block diagram of an example of the metadata manager included in the analyzer of FIG. 2.

FIG. 5 is a block diagram of an example of the metadata manager 210 included in the analyzer 138 of the system. Computer-implemented manuscripts 502 used by a complex application project that are input to the metadata manager 210 may be individually parsed by parsers 504 based on components 506 of the metadata manager 210. The parsers 504 may be included in the parsing layer 124 (FIG. 1). Outputs from the metadata manager 210 may be field values 510 in respective fields in different log entries. The field values 510 may be provided to other applications, such as tools and utilities included in the RLEIS system.

The parsers 504 may parse the manuscripts 502 based on the category or schema in which the particular manuscript 502 resides. The categories of the manuscripts 502 may be discovered based on pattern matching of different schemas of the manuscripts 502. The parsers 504 may include a manuscript parser 516, a field parser 518, a page parser 520, a forms parser 522 and a table parser 524. In other examples, additional or fewer parsers from the parsing layer may be illustrated to depicted the described functionality of the metadata manager 210. The parsers may provide an automated discovery and extraction process that abstracts the implementation details of the manuscripts to a level that does not require a user of the system to be knowledgeable about the details of the manuscripts 502, such as the code configuration, code dependencies, code complexities, details about process flows, implementation details and the like.

The manuscript parser 516 may be used to parse all manuscripts 502 and extract information about a manuscript's properties such as "manuscriptID", "captions", "inheritedFrom" etc. Such information may be used to identify a category in which a respective manuscript resides. The manuscript parser 516 may use a hierarchy component 530 during the discovery and extraction process. The hierarchy component 530 may be used to determine and generate details of hierarchal relationships among the manuscripts and details of overriding of fields in the hierarchy manuscripts. Such information may be generated and stored as part of the log entries of the respective manuscripts 502.

The field parser 518 may be used to extract details and metadata of fields such as types, rules, definition, values, etc. from all categories or schemas of manuscripts 502. In an example, the field parser 518 may extract values of the attributes of fields. To extract the field level details, the field parser 518 may read individual manuscripts 502 to extract field values from textual data included in the manuscripts 502. For example, the field parser 518 may parse a manuscript 502 in the form of an XML node and it all attributes. The field parser 518 may optionally use a converter 532 as warranted to convert textual information in a respective manuscript from a first format to a second format. For example, the converter 532 may be used to convert XML nodes to .Net objects. In this example, the converter 532 may incorporate technologies such as LINQ to XML, XML Serialization, etc., to convert XML Nodes to .Net Objects for use in the complex application project.

The field parser 518 may also use a type component 534 during determination and extraction. The type component 534 may be used to identify and generate details of field types, such as, for example, field types of Calculation, Conditional, Date, External, Iterator, Lookup, Request, etc. for a respective identified and extracted field value. Each identified type may be parsed as an individual logical block to determine the respective type identifier, which may be generated and stored in an derived field in a respective log entry as an derived field entry in association with a respective field value identified and extracted from the respective manuscript. There may be a predetermined number of field types, such as fifteen for example conditional, calculation, lookup etc., from which a type may be selected for a respective field value. In addition to an identifier of the field type, the field type may also include other details related to the corresponding field value. For example, a field type with a field type identifier of "calculation" may also include details of operands and/or operators used in the field value representing the calculation.

The page parser 520, forms parser 522 and table parser 524 may be categorical parsers used to parse specific categories or schemas of manuscripts 502. For example, the page parser 520 may be used to parse manuscripts 502 identified as being in a pages category to get details of page properties of pages included in the complex application. Details of page properties may include, for example, captions, refresh conditions, the list of reference fields available in pages, etc. The forms parser may be used to parse manuscripts categorized as forms and form control manuscripts to extract details of forms, such as form generation conditions, print orders, merge fields, etc. A form control manuscript may manage the lifecycle of a corresponding forms manuscript, and may contain various attributes of one or more corresponding forms that are present in the complex application project. In an example, the attributes of a forms manuscript may be stored in the form of table. The form control information extracted by the forms parser 522 from a form control manuscript may be used to create a high-level, e.g., an "at a glance", view of all of form manuscripts defined in the manuscripts for the complex application.

The table parser 524 may be used to parse a table, such as a table of XML, included in manuscripts to extract table details, row key, col keys and page key information. This extracted information may be included in a log entry and used to generate views of table schema, data, and statistics. In an embodiment, the views can be displayed in a tabular or matrix-based form.

The components 506 may also include a validator component 536, a rules component 538 and an expressions component 540. These components (536, 538, and/or 540) may be selectively used by any of the parsers 504 during the parsing process. The validator component 536 may be used to confirm a manuscript 502 does not contain errors, corruption, or other anomalies prior to parsing. For example, manuscripts 502, such as XML files, can be validated syntactically before extracting information. The rules component 538 may be used to convert rules, such as XML rules, into English like statements. The rules component 538 may assist a user with identifying a business rule implementation defined in a field without navigating/searching the log entries. The rules component 538 may also set values for complexity of rules according to the depth of conditions/comparisons in the rules, such as by a determination of the number of times a rules parameter is included in public fields, private fields and pages in which the rule parameter is used. The rules component 538 may also allow a user to provide parameters for identifying the complexity, such as setting the predetermined threshold(s) for the frequency of appearance of the rules parameter in the manuscripts 502. The complexity, once determined and generated, may be included as an derived field entry in the log entry. The derived field entry may be associated with the rule parameter to which it pertains.

The expressions component 540 may perform conversion from a first protocol or format to a second protocol or format when selectively used by any of the parsers 504 during the parsing process. For example, the expressions component 540 may be used to convert calculation XML into mathematics like expressions and/or English like sentences.

Referring again to FIG. 2, the analyzer 138 may also include a forms manager 212 and a custom extraction manager 214. The forms manager 212 may identify and extract data related to forms included in the complex system. Such forms may be generated and populated partially or completely with data included in the complex system. Forms data extracted and populated as field values in a log entry may include, for example, merge fields indicative of merged information from a respective manuscript, print job details for printing of a respective form, a listing of respective forms, attachments conditions for a respective form, form specific applicable parameters, such as state specific or multi-state, and the like.

The custom extraction manager 214 may be used in the complex system to display data by first deriving useful views, such as a rules present view, a revision history view and other similar data views for a respective manuscript and populating respective log entries accordingly. In addition, the custom extraction manager 214 may identify and extract integration calls (inbound/outbound) indicating use of a variable parameter by another variable parameter in a respective manuscript.

The analyzer 120 may also include a quality control engine 218. The quality control engine 218 may include quality analyzers for a build and test phase. For example, the quality control engine may include an Advanced Manuscript validator, an Advanced Form Validator, a Skins Analyzer and a Log Mining/Analyzer for identified application server logs. These automated applications may represent logical errors not visualized during compilation and unit test of the build. These may help eliminate errors creeping into the production environment by catching them in build/test phase. AI uses industry experience and past project experience to develop rules/checks to catch such defects early.

Figure 6:
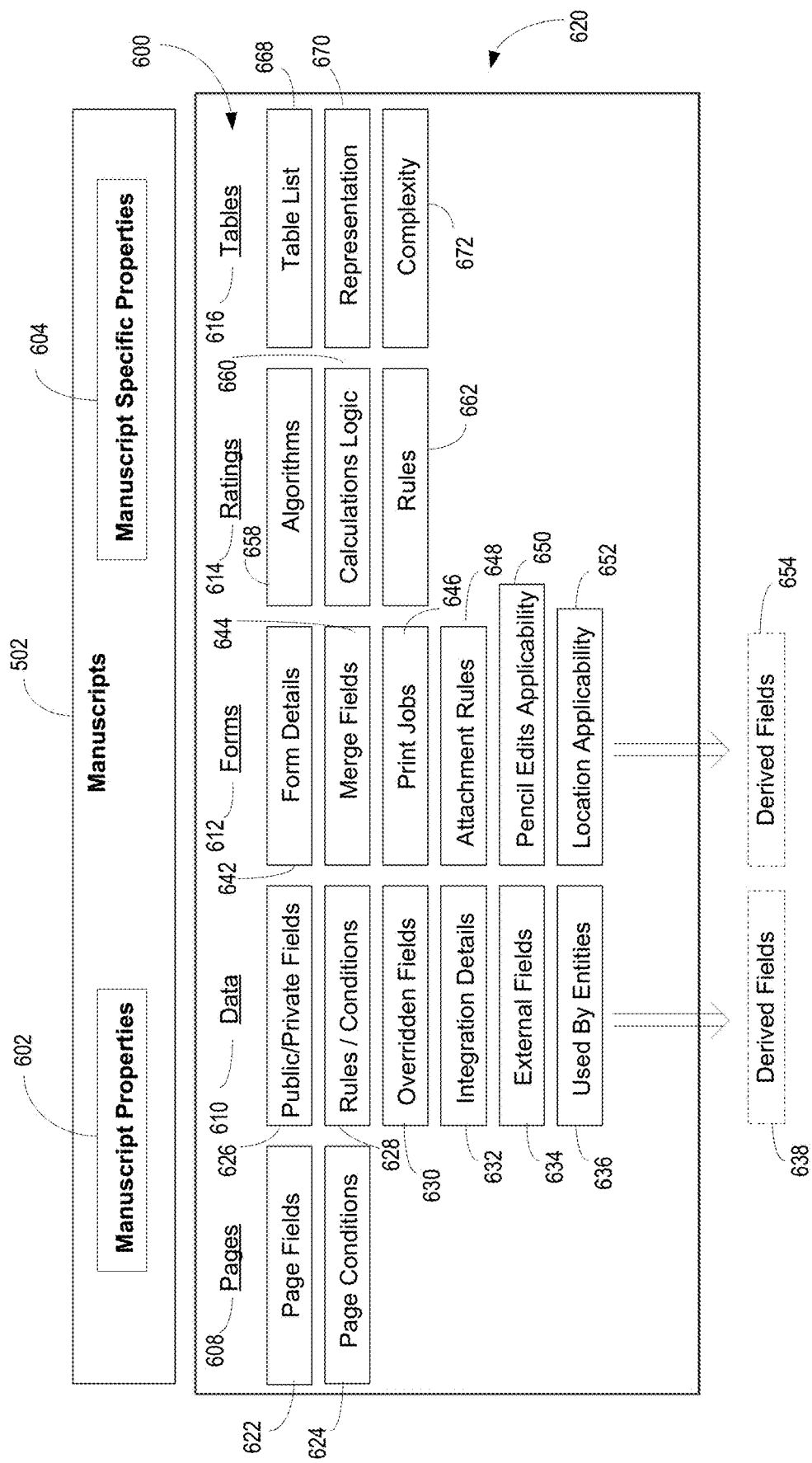
FIG. 6 is a block diagram of examples of manuscript categories of log entries.

FIG. 6 is a block diagram of examples of manuscript categories 600 of log entries. The log entries are derived from a set of manuscripts 502 used in a complex application project. The manuscripts 502 may be stored in a folder or file that is accessible to the system. Each of the manuscripts 502 may include manuscript properties 602 and manuscript specific properties 604, which may be discovered and extracted into the manuscript categories 600. In FIG. 6, manuscript categories 600 of pages 608, data 610, forms 612, ratings 614 and tables 616 are illustrated. In other examples, other categories of manuscripts may be included, such as, for example, communications and workflow. Also illustrated in FIG. 6 are examples of fields 620 populated with field values from the respective manuscripts 502.

The pages manuscript category 608 may include page fields 622 and page conditions 624. Page fields 622 may include field values such as page names, captions, reference fields available, interview, non-interview, executable logic and the like. The page conditions 624 may include field values such as refresh conditions, pop-up pages, executable logic, and the like.

The data manuscript category 610 may include public/private fields 626 providing indication of whether field values are public or private, rules/condition fields 628 that may include field values in the form of sentence like descriptions, and overridden fields 630 that may include values indicating whether a field has been updated with a new value. In addition, the data manuscript category 610 may also include integration details fields 632 with field values indicating Inbound/Outbound integration, external fields 634 indicating reference fields from other manuscripts used by entities fields 636 indicating hierarchy and inheritance of manuscript till base level.

One or more derived fields 638 may be included in the log entries and associated with the fields in the data manuscript category 610, which are also included in the log entries. The derived field(s) 638 may be fields automatically added by the system as part of the extraction process to generate the log entries from respective manuscripts. The derived fields are not part of the manuscripts and do not include data directly extracted from the manuscript, but instead are generated as new fields during the extraction process to populate the log entries at the time information extracted from the corresponding manuscripts is also used to populate the respective log entries. Derived field values may be generated by the system to populate the derived fields 638 based on information included in the respective manuscript, context, conditions or any other related information or event. The derived field values may be calculated, logically derived, generated based on a conversion and/or combination of manuscript data, and/or procured values. The derived fields 638 may be associated with another field in a log entry or with the entirety of the log entry, or some portion of the log entry. Accordingly, the derived field 638 may be indicative of one or more other fields in a log entry so as to provide additional description, context or relevant information of the field(s) with which a derived field 638 is associated.

The forms manuscript category 612 may include a form details field 642, a merge fields field 644, a print jobs field 646, an attachment rules field 648, a pencil edits applicability field 650 and a state applicability field 652. In addition, derived fields 654 which may generated during the extraction process may be associated with fields included in the forms manuscript category 612. The form details field 642 may include field values that provide details of the form, such as, a form name, form number, validity date and version. The merge fields field 644 may include field values indicative of field values that were merged as part of creating the log entry for a respective manuscript 502. The print jobs field 646 may include field values indicative of printing details for the respective form, such as an order in which the form will be printed. The attachment rules field 648 may include field values indicating conditions for modifying, printing, viewing, etc. the forms. The pencil edits applicability field 650 may include field values indicating whether run time edits of any fields are permitted just before generating the respective form. The form may be generated in a file format, such as an XML format, which can be further used in generating the form. The location applicability field 652 may include field data indicating which geographic locations the form is applicable in. For example, the field data may indicate in which states of the United States the form is applicable. In other examples, the derived fields 638 and 654 may be fields automatically added by the system as part of the extraction process of any of the any of the manuscript categories, and may be populated with additional field values.

Forms control data may be generated for a respective log entry from a forms manuscript and a forms control manuscript. One or more form manuscripts may share the same forms control manuscript. The forms control manuscript may include, for example, a table of forms details such as a form name, form number, validity date, etc., which may be extracted and added to a respective log entry. The data from the table of forms details and other form properties may be inserted into the log entry. The log entry may be presented in a grid and exported to a report tool such as MS Excel. The log entry may also be used to display form information on a user interface, such as a display screen.

FIG. 7 is an example of a GUI display illustrating a forms tab 702. The forms tab 702 may include display of a MergedFieldName field 704, a MappedField Name On Form field 706, a form name field 708, and a group identifier 710.

Referring again to FIG. 6, the ratings manuscript category 614 may include an algorithms field 658, a calculations logic field 660, and a rules field 662. The ratings manuscript may provide and/or define a pricing structure for products or services supported by the complex application. In an example, the complex application may be an insurance related application, and the ratings manuscript may support calculation of insurance premiums for insurance policy holders. In other examples, rates for other products and services may be supported by the ratings manuscript. The ratings may be determined with a ratings algorithm, which may very complex and take many different data points into account when calculating rates. Accordingly the complexity of the calculation of rates and ratings may be high. The system may provide an abstraction of these complexities by providing a categorized inventory of log entries that are organized into an architectural computer based mapping. In addition, the relational associations among the respective field values may provide capability for users to parse the complexities of the algorithm without deciphering executable code, tables and other aspects of the calculations. Moreover, such rating algorithms may span multiple manuscripts in multiple categories, which may which may be presented to a user by the system in a cohesive and understandable format due to the relational associations among the field values.

Log entry(s) corresponding to the rating module may be used to understand the rating algorithm for fields included in the log entry, such as premium, coverage, costs, etc. The log entry of the respective rating manuscript may include field values that allow a user to view the ratings calculation with any desired granularity by navigating to the nth level of the calculation of the rating value. For example, a user may access a technical field name and thereby also access the underlying rating derivation for the accessed technical field name. By accessing a technical field name down to the nth level of calculation, a user may understand how the value of the technical field name is calculated. In other words, a user can select any field in a log entry and drill down to fields and correspond reference fields to ascertain all aspects of how the field is calculated or derived. Such drill down may span multiple log entries, and may include inheritance hierarchy relationships. For example, a field a user wishes to analyze the rating calculation for may be entered into the user interface. The entered field may be searched for by the system within all the log entries of a complex application project. The system may find all the fields that participate in the rule definition, calculation, lookup into a table, request details, inheritance, etc. The participating fields may be displayed in a list, and the user may select participating fields in the list to identify additional fields that participate in the rule definition. The inheritance hierarchy may also be displayed as part of the drill down, such as by accessing the stored catalogue.

The tables manuscript 616 may include a table list field 668, a representation field 670 and a complexity field 672. The table list field 668, the representation field 670 and the complexity field 672 may form a log listing details. The log listing may be a list of tables from the scanned manuscripts with all the tables and respective row, column values. The log listing may include static tables from list of manuscripts. The user interface view of the log listing may consist of single, and multi-dimensional table structures. This information may be further useful in analyzing the application and its complexity.

Figure 8:
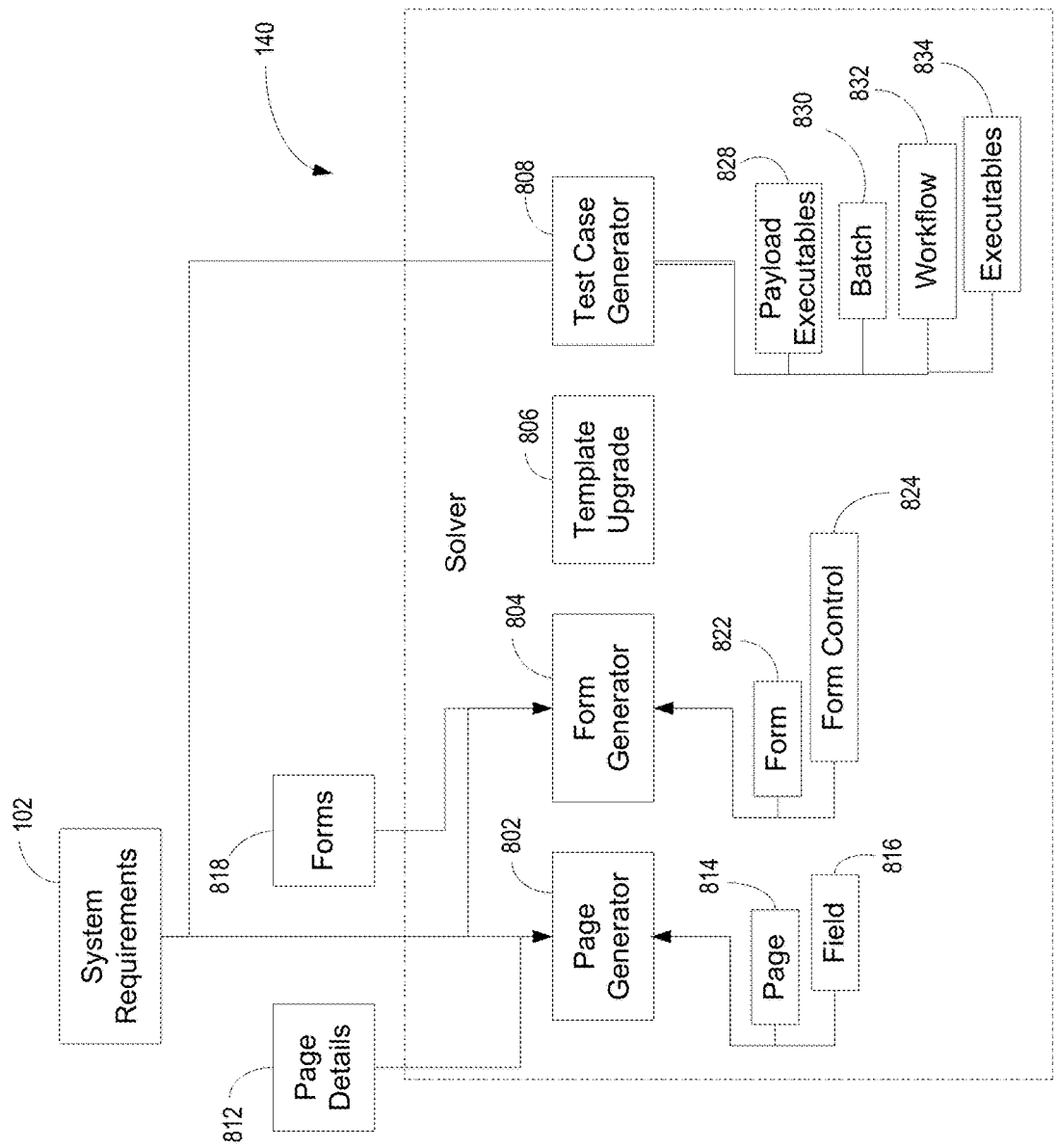
FIG. 8 is a block diagram illustrating an example of the solver included in the entities layer of FIG. 1.

FIG. 8 is a block diagram illustrating an example of the solver 140 included in the entities layer 126 of FIG. 1. The solver 140 may include a page generator 802, a forms generator 804, a template upgrade 806, and an automated test case generator 808 that automate code generation. These may be automatic code generation tools, which will take a requirements specification as input and generate code and test cases for use in developing a new or enhanced/upgraded complex system.

The page generator 802 may be circuitry and/or an engine that creates a configuration file representative of the architecture of the complex system. The configuration file may provide the capability to read the system requirements 102, which may be provided in the form of one or more requirements documents. In addition, the page generator 802 may receive a page details template 812. The page details template 812 may include page specific properties. In an example, the page generator 802 may map the system requirements into input parameters of the solver 140. As part of mapping process, the page generator 802 may validate configuration parameters provided in the system requirements, retrieve attributes and other information from the system requirements 102, and retrieve the page details from the page template 812. The page template 812 may be a predefined template file.

The page generator 802 may selectively extract information from the system requirements 102, such as extracting only some columns, and use the information included in the page template to generate page details 814 and field details 816. The page details 814 and field details 816 may, for example, be generated as code or logic, for example, XML code, in a proper format and condition to be added to respective manuscripts as appropriate to upgrade or adjust the respective field manuscript and page manuscript to which the code or logic is applied. In an example, the code generated may be for public fields of a field manuscript or a page manuscript, such as definitions, rules and respective rules attributes based on a field type described in the system requirements 102.

The form generator 804 may be circuitry and/or an engine that creates a configuration file representative of the architecture of the complex system. The configuration file may provide the capability to read the system requirements 102, which may be provided in the form of one or more requirements documents. In an example, the form generator 804 may map the system requirements into input parameters of the solver 140. As part of mapping process, the form generator 804 may validate configuration parameters provided in the system requirements, retrieve attributes and other information from the system requirements 102, and retrieve form parameters from a form template 818. The form template 818 may be a predetermined template that includes form details for one or more of the existing forms in the complex system.

The form generator 804 may selectively extract information from the system requirements 102, such as extracting only some columns, and use the information included in the page template to generate form details 822 and form control details 824. The form details 822 and form control details 824 may, for example, be generated as code or logic, for example, XML code, in a proper format and condition to be added to respective manuscripts as appropriate to upgrade or adjust the respective form manuscript and output form manuscript to which the code or logic is applied. Alternatively, a new form manuscript and/or a output form manuscript may be generated as code or logic. In an example, the code generated may be for different forms, such as different state forms, or multi-state forms based on a field type described in the system requirements 102. In addition, the code may be generated to describe merge fields and merge field details and the relationship to the respective form.

The template upgrade 806 may be circuitry and/or an engine that provides version upgrades to existing manuscripts such as data, pages, rating, rating control, form and form control manuscripts. The template upgrade 806 may include rating manuscript generation, such as state specific rating manuscript generation, a copy over process providing customization of data in version upgrades, logic and data layer updates, and entities layer updates, such as to manuscripts and related logic. In an example, the template upgrade 806 may generate state specific manuscripts, program layer manuscripts, and the like by creation of logic, properties and attributes. Manuscript properties may include, for example, a version ID, an effective date, and an effective renew date. The template upgrade 806 may also perform inheritance update within the log entries by identifying field values in the log entries that are inherited from other log entries and replacing the manuscript ID from which the field is inherited with a new manuscript ID as warranted.

When new properties and field value changes are needed, the template upgrade 806 may perform such changes in the log entries for corresponding manuscripts. For example, the template upgrade 806 may include a copy over function to iterate through the log entries and copy over updated field values in a category of manuscripts. The template upgrade 806 may also determine whether to modify logic and/or fields in an existing manuscript, or replace an existing manuscript with an updated manuscript generated by the template upgrade 806. Selective updates to logic and/or field values in the log entries in one or more categories may be performed with the template upgrade 806. Such selective updates may be based on computer automated logic driven analysis of field values to identify log entries to which a particular update is targeted. Once the log entries are updated and/or replaced, the template upgrade may generate code, such as an XML file which is exported to the complex application to upgrade and/or replace the manuscripts. In addition, the template upgrade 806 may document the changes and updates and provide an updated categorization of the manuscripts, including an updated inventory tab, metadata tab and a forms tab.

The test case generator 808 may be circuitry and/or an engine that tests the quality of the complex application using the log entries. Such quality testing may be performed by generation of payload executables 828, such as scripts, to test different operational scenarios and/or transactions within the complex system. The test case generator 808 may use the log entries and the system requirements 102 to generate payload executables 828, such as XML files. Once generated, the test case generator 808 may also generate batch updates 830 to the executables. Such batch updates 830 may be based on, for example, updates to the system requirements 102 and/or one or more of the log entries.

Following generation of the payload executables 828, the test case generator 808 may create a workflow 832 and/or an executable 834, such as a script, to define an execution sequence of the executables. This execution sequence may create an automated scenario in the complex application. Based on the workflow 832 within which the payload executables 828 are deployed, operation of the complex application in response to the automated scenario/created workflow will be tested by comparison of actual outputs of the complex application to predetermined expected outputs of the complex application. Some of the workflows 832, or portions thereof, may be modular workflows 832 involving a sequence of payload executables 828 which are coordinated by the test case generator 808. Alternatively, or in addition, some or all of the workflows 832, or portions thereof, may be individually executed as the payload executables 828. As a result of the workflow 832 or the executable 834, for example, requests for processing and information may be made to the complex application, and corresponding responses may be provided by the complex application. For modular workflows 832 and executables 834, the test case generator 808 may receive responses and dynamically update parameters in the payload executables 828 based on the received responses before generating additional parts of the modular workflow with the updated executables. Such updates may be in the form of batch updates 830 or individual updates of the payload executables 828. The resulting workflow 832 or/and executables 834 may be dynamically changed or altered during testing in response to outputs from the complex application.

In addition or alternatively, selective changes to the log entries may be performed based on the responses, and code may be generated to update the corresponding manuscripts. In this way, the complex application may be dynamically modified by modification of the manuscripts during testing. As a result, the complex application may undergo computer based modifications to improve operation, accuracy and or performance, during testing. Such changes to the complex application may improve the functional operation of the underlying computing hardware by reduction in processing complexity and/or duration. In addition, functional operation of the underlying computing hardware may be optimized by monitoring hardware resource consumption during testing and dynamically modifying the manuscripts to reduce hardware resource demands during particular tasks or processes commanded by the workflows.

Figure 9:
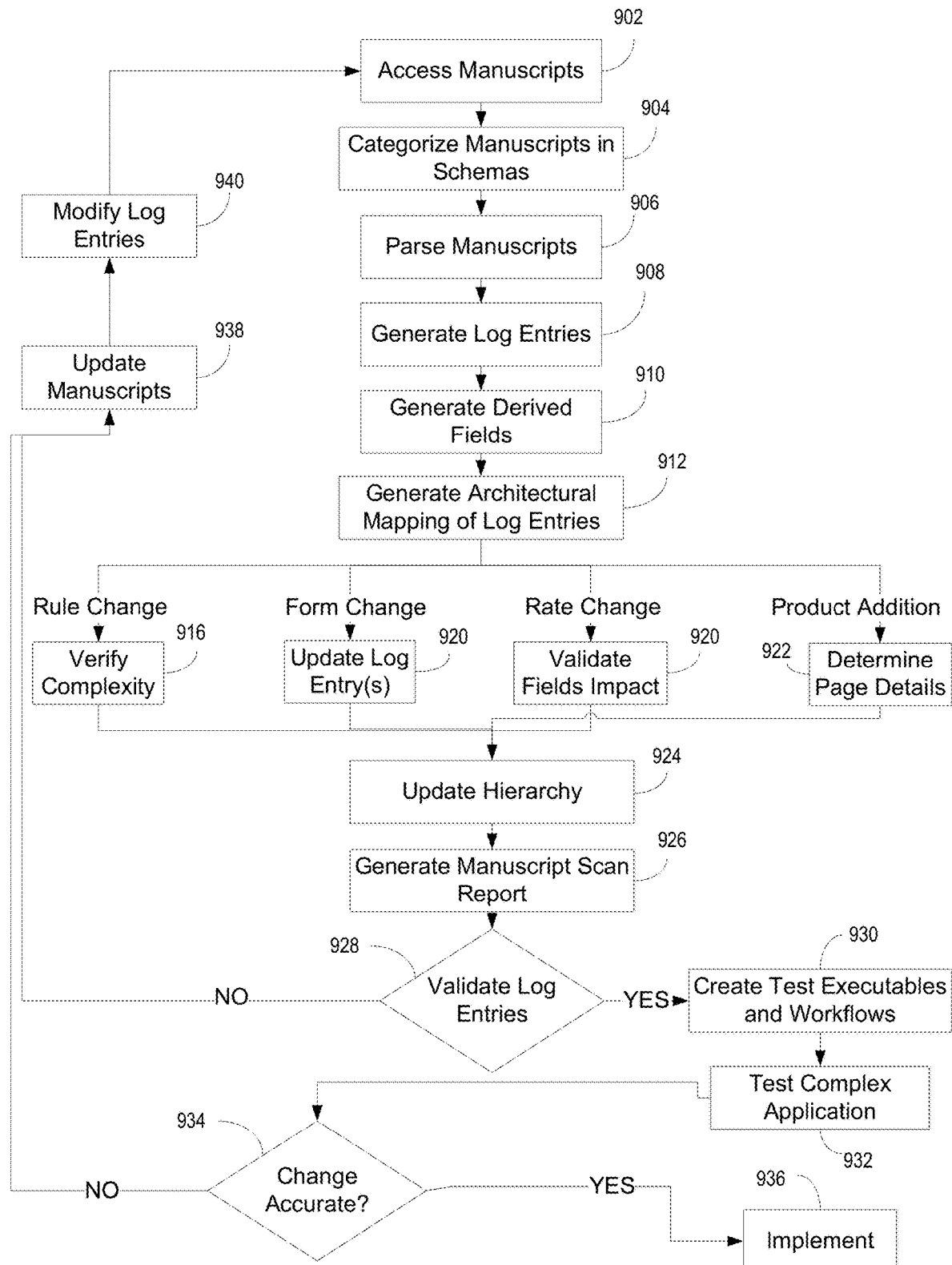
FIG. 9 is a process flow diagram illustrating example operation of the system.

FIG. 9 is a process flow diagram illustrating example operation of the system. The operation begins with accessing or retrieving the manuscripts. (902) The manuscripts may be included in a single data file, or a database, or may each be individual files. Each of the manuscripts may include data and executable logic, and may be formatted in one of a plurality of predetermined schemas. Each of the manuscripts may be categorized as being a member of one of the predetermined schema. (904) The manuscripts may be parsed by parsers that are associated with the category in which the manuscripts are categorized. (906) The manuscripts may be parsed to generate log entries representative of the manuscripts. (908) Thus, each manuscript may be transformed into a log entry which includes field values representing the properties and textual data of the manuscript.

The system may generate derived fields in a respective log entry based on parsing and analysis of the respective manuscript. (910) The derived field values may be descriptors of at least some of the field values. The system may create relational associations among the field values of different log entries. The relational associations may be based on the categorization of the log entries, the field values, and/or the derived field values. The system may also generate an architectural computer based dimensional mapping of the categorized inventory of log entries. (912) The dimensional mapping may be provided in any number of different GUI views to illustrate the relational associations among the field values.

In response to a rule change of one or more of the log entries, the system may verify that the complexity of the changed log entries remains the same. (916) In response to a form change in one or more log entries, the system may update the log entries with the change. (918) In response to a rate change in the rates charged to a client of the complex system in one or more log entries, the system may validate the fields impact. (920) In response to addition of a new product or revisions to an existing product by addition or revision of the log entries, the system may determine page details of the product. (922) In other examples, any other actions could be included, such as removing or adding new rules, forms, rates or products. In addition, in other examples, other types of activities may be included.

Following activities such as an addition or change in the log entries, the system may update other log entries by updating the hierarchy among the log entries that are affected by the change or addition. (924) The hierarchy may be updated by, for example, modifying a file, such as a catalogue file that includes a description of the hierarchical relationships among the manuscripts and corresponding log entries.

The manuscript scan report generated by the system is useful for preparing/modifying a requirements document reflecting the change or addition. (926) The system may also validate that the changes in the log entries are correct. (928) If the changes in the log entries are validated using the quality control analyzer 202, the system may create test executables, such as scripts, and workflows as part of the validation process. (930) The system may then use the test executables, such as scripts, and workflows to confirm that changes or additions providing the updated rule due to the rule change. (932) It may be determined if the change/addition was correct and provided the expected test results. (934) if the changes/additions was successfully tested, an update to the manuscript may be generated and implemented within the complex application. (936)

If the changes to the log entry are not able to be validated (block 928), the system may report the test result. The validation report will be shared with developers. They will make required and appropriate changes. The change may reflect changes in manuscripts (938) and in turn will modify the log entry to overcome the non-validation. (940) Modifications to the manuscripts may be based on, for example, data, a script, or an executable such as, an XML snippet, to be add, modify, delete the existing manuscript in the complex system, and the operation returns to accessing the manuscripts.

The system may be implemented in computing device such as a desktop computer, laptop computer, or tablet computer, a server, etc.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method of complex computing application management comprising:
    retrieving a plurality of computer-implemented product definitions by extraction from a computing application;
    the product definitions being a schema in a computer readable and text based data format used as components upon which the computing application operates, the product definitions comprising:
        product definition properties, and
        textual data;
    parsing each of the extracted product definitions with a parser,
        the parsing to extract the product definition properties and the textual data included in a respective one of the product definitions;
    performing computer based discovery and identification of a predetermined category in which a respective product definition resides;
        selectively parsing the product definitions with categorical parsers,
    the categorical parsers used to parse specific identified categories of product definitions for category specific properties of the specific identified categories;
    generating a categorized inventory of log entries,
        the categorized inventory of log entries including the product definition properties, the textual data, and the category specific properties as respective field values of respective log entries,
        each of the log entries being representative of one of the product definitions, and
        each of the log entries being categorized in the categorized inventory of log entries according to the predetermined category;
    generating derived field values in at least some of the log entries,
        the derived field values being descriptors of at least some of the respective field values;
    adaptively creating associations among the respective field values,
        the respective field values of different respective log entries within the categorized inventory of log entries based on the respective field values and the derived field values; and
    generating a computer based dimensional mapping of the categorized inventory of log entries based on an association among the respective field values and the derived field values.

2. The method of claim 1, further comprising receiving a modification to one of the log entries via a graphical user interface; generating an update to a product definition corresponding to the one of the log entries; and exporting the update to the computing application for execution to update the product definition corresponding to the one of the log entries.

3. The method of claim 1, wherein generating derived field values comprises identifying a frequency of occurrence of a rule parameter in the log entries; and assigning a predetermined level of rule complexity to a log entry in accordance with the frequency of occurrence of the rule parameter in the log entries.

4. The method of claim 1, wherein generating derived field values as descriptors of at least some of the respective field values comprises identifying a type classification of a field value and storing the type classification as an additional field value in association with the field value.

5. The method of claim 1, wherein the parser is a product definition parser, and parsing each of the product definitions comprises parsing all of the product definitions with the product definition parser to perform computer based identification of the predetermined category in which a respective product definition resides.

6. The method of claim 1, wherein selectively parsing the product definitions with categorical parsers comprises retrieving a categorical parser of the predetermined category for the respective product definition, the categorical parser of the predetermined category being one of a plurality of predetermined categorical parsers comprising a page parser, a forms parser and a table parser; and parsing, with the categorical parser of the predetermined category, the respective product definitions to extract product definition specific properties for the respective product definition comprises extracting, with the page parser, page properties of product definitions categorized as pages included in the computing application; extracting, with the table parser, table details included in product definitions categorized as including a table; and extracting, with the forms parser, details of product definitions categorized as forms or form controls from product definitions categorized as form or form control product definitions.

7. The method of claim 1, wherein generating the categorized inventory of log entries comprises identifying each of the product definitions as being in one of a plurality of categories.

8. The method of claim 1, wherein the product definition properties include an inheritance value, the inheritance value indicative of a relationship in which field values of a first product definition file are identified as inherited field values in a second product definition file.

9. The method of claim 8, wherein the inherited field values are not duplicated in field values of the respective log entries of the second product definition file.

10. A system for managing complex applications comprising:
    a processor configured to:
        access a plurality of computer-implemented product definitions stored in memory in association with a computing application, each of the product definitions including data and executable logic formatted in one of a plurality of predetermined schemas in a computer readable and text based data format used as components upon which the computing application operates;

identify, each of the product definitions as being a member of a predetermined schema included in the plurality of predetermined schemas;

retrieve a first parser based on identification of a first product definition as having a first predetermined schema, the first parser executable by the processor to extract information specific to the first predetermined schema of the first product definition to generate a first log entry representative of the first product definition;

retrieve a second parser based on identification of a second product definition as being a second predetermined schema, the second parser executable by the processor to extract information specific to the second predetermined schema of the second product definition to generate a second log entry representative of the second product definition;

retrieve a third parser executable by the processor to extract textual information included in the first product definition and textual information included in the second product definition, the textual information extracted based on the first predetermined schema and the second predetermined schema, respectively;

store the extracted textual information included in the first product definition as respective field values in the first log entry and store the extracted textual information included in the second product definition as respective field values in the second log entry;

categorize the first log entry and the second log entry as being in different categories; and generate a computer based architectural dimensional mapping of the first log entry and the second log entry based on categorization of the first log entry and the second log entry as being in different categories.

11. The system of claim 10, wherein the first parser and the second parser each comprises a product definition parser and a categorical parser, the product definition parser executable to extract product definition properties common to all the product definitions, the categorical parser of the first parser configured to only parse product definitions identified as members of the first predetermined schema, and the categorical parser of the second parser configured to only parse product definitions identified as members of the second predetermined schema.

12. The system of claim 10, wherein the processor is further configured to generate derived field entries for insertion as new fields in each of the first log entry and the second log entry, the derived field entries being associated with and descriptive of respective derived field values in each of the first log entry and the second log entry.

13. The system of claim 12, wherein the processor is further configured to generate the computer based architectural dimensional mapping of the first log entry and the second log entry based on categorization of the first log entry and the second log entry and association of the respective derived field values and the derived field entries.

14. The system of claim 10, wherein the processor is further configured to output a display of relational associations among field values in accordance with the computer based architectural dimensional mapping.

15. The system of claim 10, wherein the processor is further configured to: identify the textual information extracted from a product definition as a rule or calculation;

translate the rule or calculation into a sentence statement; and store the sentence statement in a respective derived field value of the first log entry or the second log entry as the rule or calculation.

16. The system of claim 10, wherein the third parser is a field parser executable by the processor to extract details and metadata included in all of the product definitions.

17. A non-transitory computer readable medium configured to store instructions executable by a processor to manage a complex application, the computer readable medium comprising:

instructions executable by the processor to retrieve a plurality of computer-implemented product definitions stored in association with a computing application, the product definitions being a schema in a computer readable and text based data format used as components upon which the computing application operates;

instructions executable by the processor to categorize each of the product definitions in one of a plurality of predetermined categories;

instructions executable by the processor to parse each of the product definitions with a parser corresponding to the one of the plurality predetermined categories to extract information specific to the one of the plurality of predetermined categories;

instructions executable by the processor to parse all of the product definitions to extract field values of each respective product definition;

instructions executable by the processor to generate log entries for each of the product definitions, each of the log entries including the information specific to the one of the plurality of predetermined categories and the field values;

instructions executable by the processor to generate and add derived field values to each of the log entries; and instructions executable by the processor to generate a computer based architectural dimensional mapping of the log entries based on the information specific to the one of the plurality of predetermined categories, the field values, and the derived field values.

18. The computer readable medium of claim 17, wherein the instructions executable by the processor to parse each of the product definitions with the parser corresponding to the one of the plurality predetermined categories comprises instructions to select the parser from among a plurality of categorical parsers, the categorical parsers comprising a page parser, a forms parser and a table parser; and instructions executable with the processor to extract, with the page parser, from product definitions identified as being in a pages category, page properties of pages included in the computing application, extract, with the table parser, table details included in a respective product definition categorized as having a table, and extract, with the forms parser, details of forms or form controls from product definitions categorized as form or form control product definitions.

19. The computer readable medium of claim 17, wherein the instructions executable by the processor to categorize each of the product definitions in one of the plurality of predetermined categories comprises instructions executable with the processor to parse all the retrieved product definitions and discover a predetermined category in which a respective product definition resides based on attributes extracted from the respective product definition and pattern matching the schema of the respective product definition.

* * * * *